(12) United States Patent
Friend et al.

(10) Patent No.: US 10,412,029 B2
(45) Date of Patent: Sep. 10, 2019

(54) PROVIDING RICH PREVIEW OF COMMUNICATION IN COMMUNICATION SUMMARY

(71) Applicant: MICROSOFT TECHNOLOGY LICENSING, LLC, Redmond, WA (US)

(72) Inventors: Ned Bearer Friend, Bellevue, WA (US); March Rogers, Seattle, WA (US); Hiroshi Tsukahara, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 14/966,360

(22) Filed: Dec. 11, 2015

(65) Prior Publication Data

US 2017/0171122 A1    Jun. 15, 2017

(51) Int. Cl.
| | |
|---|---|
| *H04L 12/58* | (2006.01) |
| *G06Q 10/10* | (2012.01) |
| *G06F 3/0481* | (2013.01) |
| *G06F 3/0484* | (2013.01) |
| *G06F 7/08* | (2006.01) |
| *G06F 17/22* | (2006.01) |
| *G06F 17/24* | (2006.01) |
| *G06F 17/27* | (2006.01) |

(Continued)

(52) U.S. Cl.
CPC .......... *H04L 51/08* (2013.01); *G06F 3/0481* (2013.01); *G06F 3/0484* (2013.01); *G06F 7/08* (2013.01); *G06F 17/2235* (2013.01); *G06F 17/24* (2013.01); *G06F 17/2705* (2013.01); *G06Q 10/10* (2013.01); *G06Q 10/107* (2013.01); *G06T 3/40* (2013.01); *G06T 11/60* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 7,996,045 B1 * | 8/2011 | Bauer | G06F 3/0488 455/466 |
| 8,345,832 B2 | 1/2013 | Hamaker et al. | |

(Continued)

FOREIGN PATENT DOCUMENTS

| | | |
|---|---|---|
| WO | 2009098671 A2 | 8/2009 |
| WO | 2015029011 A1 | 3/2015 |

OTHER PUBLICATIONS

Broida, Rick, "Preview Gmail Messages Before Opening Them", Published on: May 20, 2011 Available at: http://www.pcworld.com/article/228321/Gmail.html.

(Continued)

*Primary Examiner* — Howard Cortes
(74) *Attorney, Agent, or Firm* — Michael Best & Friedrich LLP

(57) ABSTRACT

A rich preview of a communication in a communication summary is provided. A communication application analyzes a communication to identify relevant items within the communication. A communication summary of the communication is created with the relevant items. Next, the communication summary is presented with the relevant items. Interaction elements are also provided to manage a presentation of the relevant items.

16 Claims, 7 Drawing Sheets

(51) Int. Cl.
*G06T 3/40* (2006.01)
*G06T 11/60* (2006.01)

(56) References Cited

U.S. PATENT DOCUMENTS

| | | | |
|---|---|---|---|
| 8,903,931 | B1 | 12/2014 | Rothman et al. |
| 9,633,114 | B1* | 4/2017 | Kamangar ........ G06F 17/30864 |
| 2006/0075046 | A1* | 4/2006 | Yozell-Epstein .... G06Q 10/107 |
| | | | 709/206 |
| 2007/0011258 | A1 | 1/2007 | Khoo |
| 2007/0082707 | A1* | 4/2007 | Flynt .................... G06F 3/0481 |
| | | | 455/564 |
| 2008/0171535 | A1 | 7/2008 | Carmody et al. |
| 2009/0019107 | A1* | 1/2009 | Lance ................... G06Q 10/00 |
| | | | 709/203 |
| 2009/0030940 | A1* | 1/2009 | Brezina ................ H04M 15/00 |
| 2009/0030991 | A1 | 1/2009 | Vakkalanka |
| 2011/0179061 | A1* | 7/2011 | Chilakamarri ......... G06Q 10/00 |
| | | | 707/769 |
| 2012/0226760 | A1* | 9/2012 | Lewis ................. G06Q 10/107 |
| | | | 709/206 |
| 2012/0284639 | A1* | 11/2012 | Yuniardi ................ G06Q 10/00 |
| | | | 715/752 |
| 2013/0006973 | A1* | 1/2013 | Caldwell ........... G06F 17/30719 |
| | | | 707/723 |
| 2013/0318582 | A1 | 11/2013 | McCann et al. |
| 2013/0325972 | A1* | 12/2013 | Boston ............... G06K 9/00751 |
| | | | 709/206 |
| 2014/0040770 | A1 | 2/2014 | Khoo |
| 2014/0169644 | A1* | 6/2014 | Dockhorn .......... G06K 9/00221 |
| | | | 382/118 |
| 2014/0173457 | A1 | 6/2014 | Wang et al. |
| 2014/0225897 | A1* | 8/2014 | Sarrazin ............... G06Q 10/109 |
| | | | 345/467 |
| 2014/0245118 | A1 | 8/2014 | Poozhiyil et al. |
| 2014/0282214 | A1* | 9/2014 | Shirzadi .............. G06F 3/04883 |
| | | | 715/781 |
| 2015/0082189 | A1 | 3/2015 | Baer et al. |
| 2015/0113436 | A1* | 4/2015 | Penha ................... G06F 3/0481 |
| | | | 715/752 |
| 2015/0135109 | A1* | 5/2015 | Zambetti ............... G06F 3/0488 |
| | | | 715/767 |
| 2015/0143211 | A1 | 5/2015 | Kaufthal et al. |
| 2015/0186390 | A1 | 7/2015 | Katic et al. |
| 2015/0200885 | A1* | 7/2015 | Sharp ...................... H04L 51/08 |
| | | | 709/206 |
| 2015/0200899 | A1* | 7/2015 | Sanketi .................... H04L 51/24 |
| | | | 709/206 |
| 2015/0271118 | A1* | 9/2015 | Nudel ...................... H04L 51/08 |
| | | | 709/206 |
| 2016/0065511 | A1* | 3/2016 | Ganin .................... H04L 51/063 |
| | | | 709/206 |
| 2016/0196013 | A1* | 7/2016 | Gardenfors ........... G06F 3/0482 |
| | | | 715/783 |
| 2016/0219004 | A1* | 7/2016 | Erez ....................... G06Q 10/10 |
| 2017/0090705 | A1* | 3/2017 | Fern ...................... G06F 3/0481 |
| 2017/0161372 | A1* | 6/2017 | Fern Ndez ............ G06F 17/218 |

OTHER PUBLICATIONS

"MailEnable", Published on: Feb. 24, 2015 Available at: http://www.mailenable.com/features/web-mail.asp.

"Inbox by Gmail", Retrieved on: Sep. 28, 2015 Available at: http://www.google.co.in/inbox/.

"More About Gmail 's New Attachment UI", Retrieved from <<http://googlesystem.blogspot.de/2013/11/more-about-gmails-new-attachment-ui.html>>, Nov. 21, 2013, 3 Pages.

"Official Google Blog: Attachments in Gmail, Now with the Power of Google Drive", Retrieved from <<https://googleblog.blogspot.de/2013/11/attachments-in-gmail-now-with-power-of.html>>, Nov. 12, 2013, 4 Pages.

"International Search Report and Written Opinion Issued in PCT Application No. PCT/US2016/063715", dated Feb. 3, 2017, 12 Pages.

"Second Written Opinion Issued in PCT Application No. PCT/US2016/063715", dated Sep. 29, 2017, 8 Pages.

"Email Attachment Tracking for Gmail Bananatag", Retrieved From: <<https://web.archive.org/web/20150906154356/https://bananatag.com/attachment-tracking>>, Sep. 6, 2015, 3 Pages.

"Pointofmail.com Track Email, Recall Email, Get Read Receipts, Email Tracking and Marketing", Retrieved From: <<https://web.archive.org/web/20151205153629/https://www.pointofmail.com/>>, Dec. 5, 2015, 2 Pages.

"International Preliminary Report on Patentability Issued in PCT Application No. PCT/US2016/063715", dated Feb. 16, 2018, 9 Pages.

* cited by examiner

PROVIDING RICH PREVIEW OF COMMUNICATION IN COMMUNICATION SUMMARY

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications facilitate communications.

In a communication application user interface, the messages (and other items such as calendar invites) may look the same in a user's inbox. Thus, it may be hard for the user to identify and search for messages that are important to him/her. The user may also need to open a reading pane to act on the listed messages.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a rich preview of a communication in a communication summary. In some examples, a communication application may analyze a communication to identify relevant items within the communication. A communication summary of the communication may be created with the relevant items. Next, the communication summary may be presented with the relevant items. Interaction elements may be provided to manage a presentation of the relevant items.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
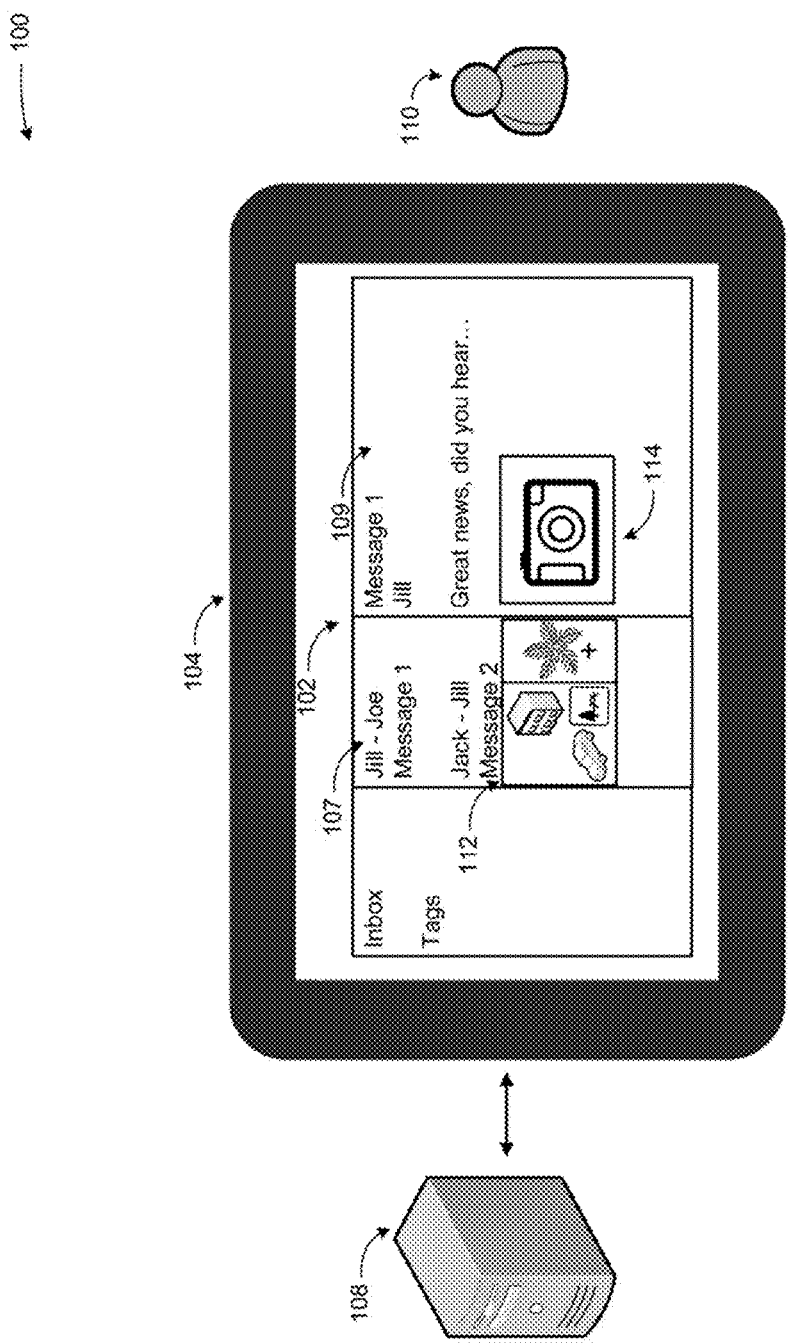
FIG. 1 is a conceptual diagram illustrating an example of providing a rich preview of a communication in a communication summary, according to embodiments.

As briefly described above, rich preview of a communication may be provided in a communication summary by a communication application. The communication application may initiate a process to provide the rich preview of a communication with an operation to analyze the communication. The communication may be analyzed to identify relevant items. The relevant items may include an image, a video, an audio, a document, a link, a task, and/or a meeting, among others. A communication summary of the communication may be created with the relevant items. The relevant items may be customized for a presentation based on a type of the relevant item.

The communication summary may be presented with the relevant items within a summary user interface (UI). The relevant items may be dynamically sized based on attributes of the relevant items and the size of the communication summary. Furthermore, interaction elements may be provided to manage the presentation of the relevant items. An interaction element may include operations to launch an application associated with a relevant item to present and manage the relevant item.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a rich preview of a communication in a communication summary. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of providing a rich preview of a communication in a communication summary, according to embodiments.

In a diagram 100, a computing device 104 may execute a communication application 102. Examples of the communication application 102 may include an email processing application, a messaging application, and/or a conferencing application, among others. The computing device 104 may include a tablet device, a laptop computer, a desktop computer, and a smart phone, among others. The computing device 104 may include a special purpose computing device configured to provide communications management through a display component configured to display communications, a communication component configured to transmit communications, and/or a storage component configured to store communications, among other components.

The computing device 104 may display the communication application 102 to a participant 110. The participant (such as a person) may receive and transmit a communication 109 (and other communications) to communicate with other participants. The participant 110 may be allowed to interact with the communication application 102 through an input device or touch enabled display component of the computing device 104. The computing device 104 may also include a display device such as the touch enabled display component, and a monitor, among others to provide the communication application 102 to the participant 110.

A rendering module of the communication application 102 may present a summary UI 107 of communications between the participant 110 and other participants. The rendering module may also display a communication 109 associated with one of the communication summaries. The communication 109 may include an email, a message, a video conference, and/or an audio conference, among others.

A content module of the communication application 102 may analyze the communication 109 to identify a relevant item 114 within the communication. The relevant item may include an image, a video, an audio, a document, a link, a task, and/or a meeting, among others. A communication summary 112 of the communication 109 may be created with the relevant item 114. Next, the communication summary 112 may be presented with the relevant item 114 within the summary UT 107. The relevant item 114 may be dynamically sized based on attributes of the relevant item 114 and the size of the communication summary 112. Interaction elements may be also provided to manage the presentation of the relevant item 114.

The communication 109 may be stored and managed locally within the computing device 104. Alternatively, the communication 10) may be retrieved from a server 108 such as a content server, and/or a communication server, among others that manages communications. Another example of the server 108 may include an email server that provides communications to be presented by the communication application 102. Furthermore, the computing device 104 may communicate with the server 108 through a network. The network may provide wired or wireless communications between nodes such as the computing device 104, or the server 108, among others.

Alternatively, the server 108 may provide the communication application 102. The server 108 may also provide a client interface of the communication application 102 for presentation by the computing device 104. The server 108 may execute operations to provide a rich preview of a communication in a communication summary through the communication application 102.

The participant 110 may interact with the communication application 102 with a keyboard based input, a mouse based input, a voice based input, a pen based input, and/or a gesture based input, among others. The gesture based input may include one or more touch based actions such as a touch action, a swipe action, and a combination of each, among others.

While the example system in FIG. 1 has been described with specific components including the computing device 104, the communication application 102, embodiments are not limited to these components or system configurations and can be implemented with other system configuration employing fewer or additional components.

Figure 2:
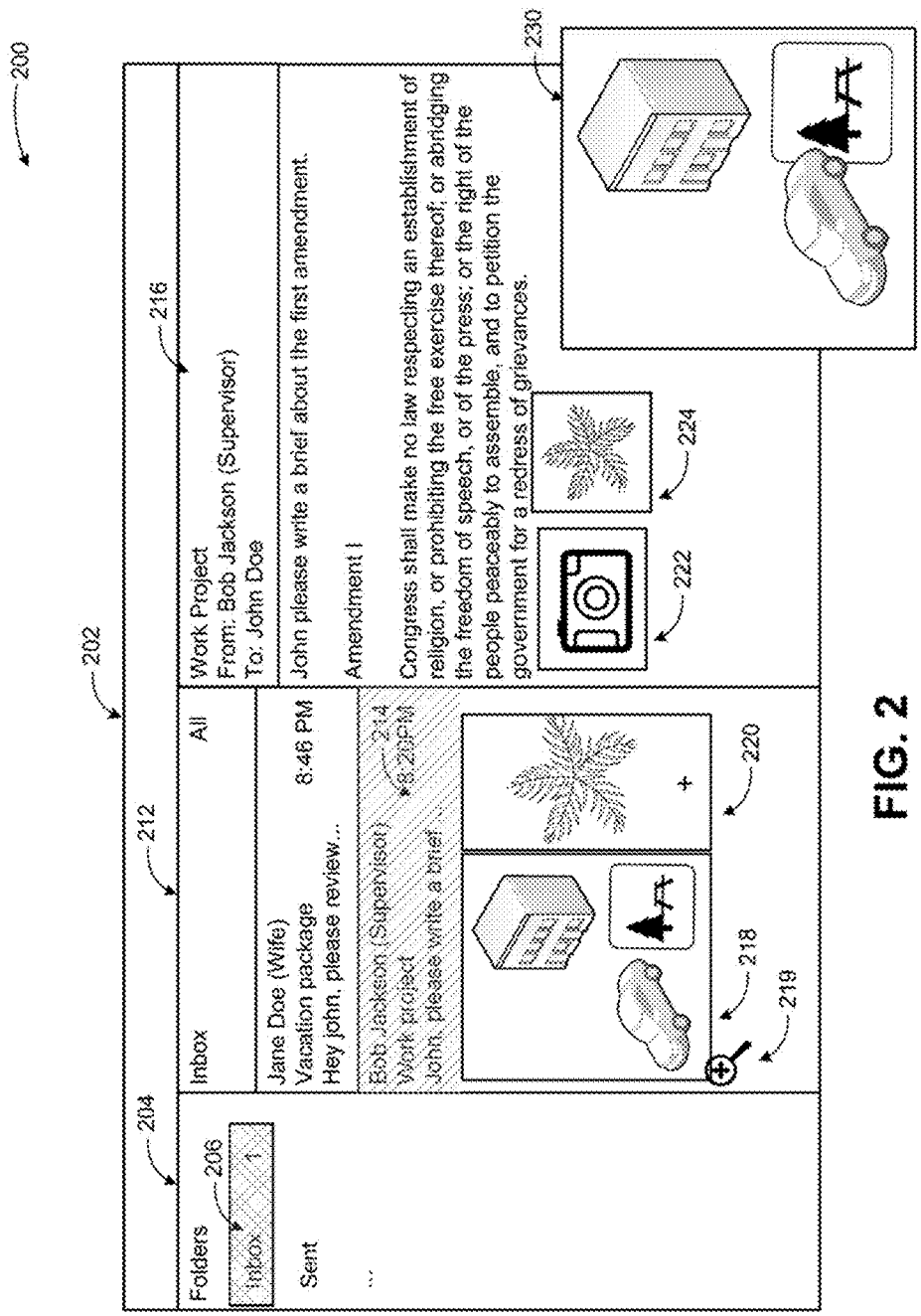
FIG. 2 is a display diagram illustrating an example of providing image based content within a communication summary, according to embodiments.

FIG. 2 is a display diagram illustrating an example of providing image based content within a communication summary, according to embodiments.

In a diagram 200, a communication application 202 may provide UI elements to present communication summaries and communications. A rendering module of the communication application 202 may provide a navigation UI 204 that includes navigation elements to display groupings of communication summaries in summaries UI 212. For example, a navigation element 206 may include operations to display communication summaries of communications within an inbox. The rendering module may also present other navigation elements grouping the communications based on criteria selected by a participant or other entities within the navigation UI 204.

The rendering module of the communication application 202 may provide the summaries UI 212 to present communication summaries. A communication summary 214 may include a description of a sender, a subject, and/or a presentation of a communication 216. In response to an action on the communication summary 214, the rendering module may display the communication 216. A subject, a sender, and/or a receiver of the communication 216 may be displayed along with content of the communication 216.

The content of the communication 216 may include items such as an image, a video, an audio, a document, a link, a task, and/or a meeting, among other relevant items to a participant. As such, a content module of the communication application 202 may analyze the communication 216 to identify relevant items. Images (222, 224) may be identified as the relevant items. An image 222 may be detected as inserted into the communication 216 as an attachment. An image 224 may be detected as embedded into the communication 216.

The content module of the communication application 202 may create the communication summary 214 with a relevant item 218. The relevant item 218 may be created from the image 222. In an example scenario, a read status associated with the image 222 may be identified as unread. The relevant item 218 may be rescaled to draw a participant's attention to the image 222 within the communication 216. The relevant item 218 may be rescaled dynamically to maximize a size of the image 222 presented within the communication summary 214. The size of the image 222 may be rescaled for the relevant item 218 based on available width or available height in the communication summary 214. A zoom control element 219 may be provided to manually manage rescaling of the relevant item 218 or another relevant item.

Other relevant items such the image 224 may also be presented within the communication summary 214. The relevant item 220 be created from the image 224. The relevant item 220 may be presented with an interaction element that indicates availability of additional relevant items associated with the communication 216. For example, the rendering module may be unable to display multiple images as relevant items in the communication summary 214 due to insufficient size, width, and/or height of the communication summary 214. In such a scenario, the relevant item 220 may be actionable and may include operations to display the other relevant items in response to an action on the relevant item 220.

Alternatively, the images (222 and 224) and other images may be sorted based on importance criteria. The importance criteria may be a ranking provided by a participant to the images (222 and 224) and other images. The images (222 and 224) and the other images may be sorted based on a range from a high importance value to a low importance value.

The images (222 and 224) and other images may also be presented as the relevant items (218 and 220) and other relevant items, as sorted, within the communication summary 214. A navigation element may also be provided to access the other relevant items when a size of the communication summary 214 is insufficient to display the other relevant items.

The rendering module of the communication application 202 may also provide the relevant items (218 and 220) with operations to launch an application associated with the images (222 and 224). The application may be launched in response to a detected action on the relevant items (218 and 220). The application may be launched to provide further functionality to manage the images (222 and 224), such as editing functionality, among others.

Figure 3:
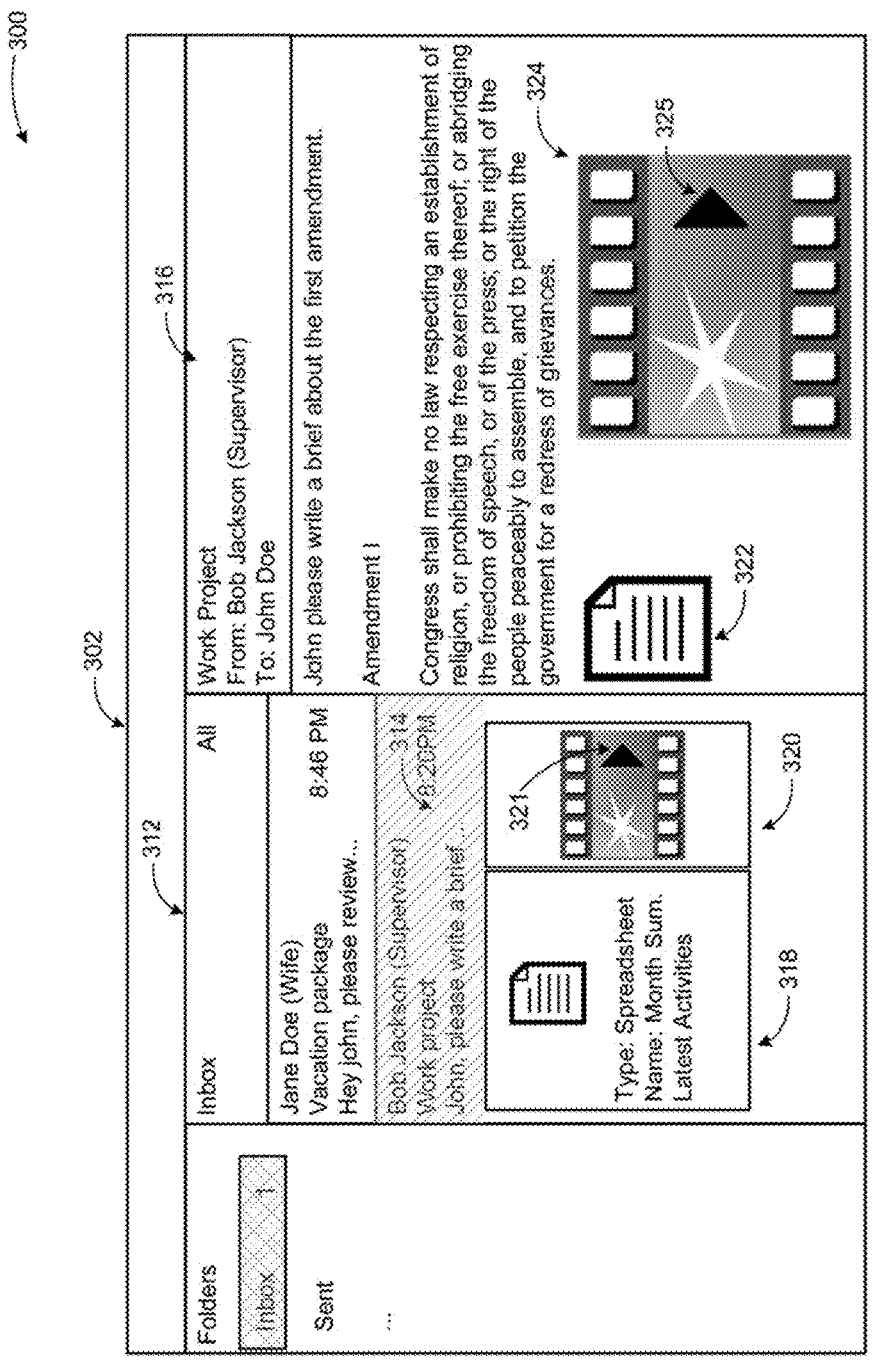
FIG. 3 is a display diagram illustrating an example of providing video and document based content within a communication, according to embodiments.

FIG. 3 is a display diagram illustrating an example of providing video and document based content within a communication, according to embodiments.

In a diagram 300, a communication application 302 may provide a communication summary 314 of a communication 316 within a communication UI 312. The communication 316 may be analyzed by a content module of the communication application 302 to identify relevant items. A document 322 attached to the communication 316 may be identified as a relevant item. The content module may create the relevant item 318 from the document 322. The relevant item 318 may include attributes of the document 322 such as a document type, a document name, and/or recent activities associated with the document 322, among others. The recent activities may include a recent access to the document 322 by a participant of the communication or by other entities.

The relevant item 318 may be presented by a rendering module of the communication application 302 within the communication summary 314. The relevant item 318 may include a document type, a document name, and/or one or more recent activities associated with the document 322. The relevant item 318 may also be presented with an interaction element. In response to an action on the relevant item 318, operations to launch an application associated with the document may be executed. The application may provide further functionality to manage the document 322.

A video 324 may also be identified as a relevant item. The content module of the communication application 302 may analyze the communication 316 to identify the video 324. The content module may create the relevant item 320 from the video 324. The relevant item 320 may include attributes of the video 324 such as a title, a source, and/or a description of the video 324, among others.

The relevant item 320 may be presented by a rendering module of the communication application within the communication summary 314. The relevant item 320 may include a title, a source, and/or a description of the video 324. The relevant item 320 may also be presented with an interaction element 321. Operations to play the relevant item 320 in the communication summary 314 may be executed in response to a detected action on the interaction element 321.

Another interaction element may also provide operations to launch an application associated with the video 324 in response to an action on the relevant item 320. The application may provide further functionality to display and manage the video 324. The video 324 may also be provided with an interaction element 325 to display and manage the video within the communication 316.

Figure 4:
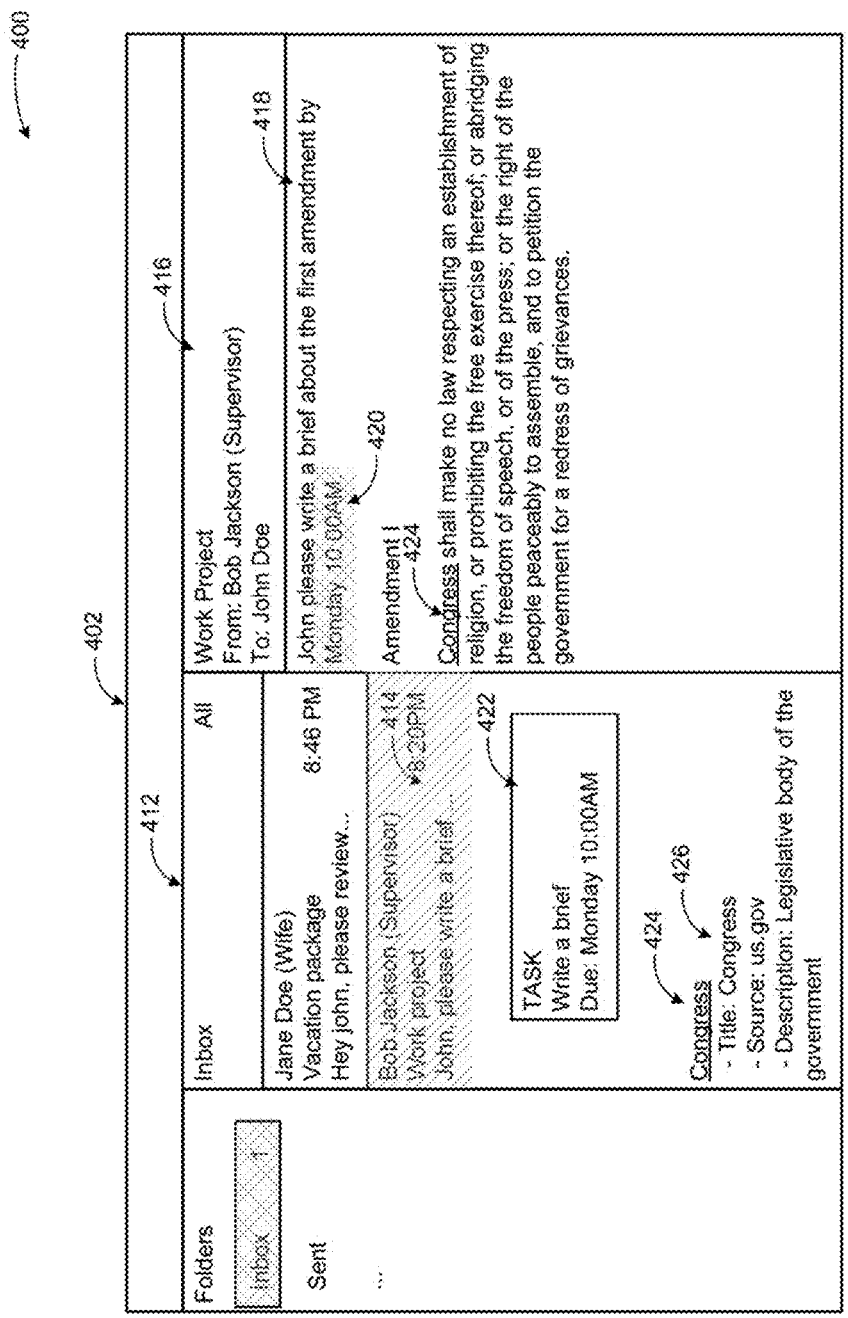
FIG. 4 is a display diagram illustrating an example of providing a task based content within a communication, according to embodiments.

FIG. 4 is a display diagram illustrating an example of providing a task based content within a communication, according to embodiments.

In a diagram 400, a content module of a communication application 402 may parse a content 418 of a communication 416 to identify a link 428. The link 428 may be used to create a relevant item 424. Attributes 426 of the link 428 may also be identified and inserted into the relevant item 424. The attributes 426 may include a title, a source, and/or a description, among others.

A rendering module of the communication application 402 may display the relevant item 424 within the communication summary 414. The attributes 426 of the relevant item may also be displayed. Furthermore, the relevant item 424 may also be provided with an interaction element. In response to an action on the relevant item 424, operations to access a source associated with the link 428 may be executed.

In another scenario, a content 418 of the communication 416 may be parsed by the content module of the communication application 402 to identify a task 420 (or a meeting) associated with the communication 416. Attributes of the task 420 (or the meeting) may also be identified. The attributes may include a subject, and/or a time, among others. A relevant item 422 may be created with the attributes such as the subject and/or time of the task 420 (or meeting). The relevant item 422 may be presented within the communication summary 414. The relevant item 422 may also include a reminder associated with the task 420 (or the meeting).

As discussed above, the application may be employed to perform operations to provide a rich preview of a communication in a communication summary. An increased user efficiency with the communication application 102 may occur as a result of presenting relevant items of a communication in a communication summary. Additionally, automating content promotion and presentation within a communication summary may reduce processor load, increase processing speed, conserve memory, and reduce network bandwidth usage.

Embodiments, as described herein, address a need that arises from a lack of efficiency between the participants interacting through communication applications executed on various computing devices. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Rich preview of a communication in a communication summary may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
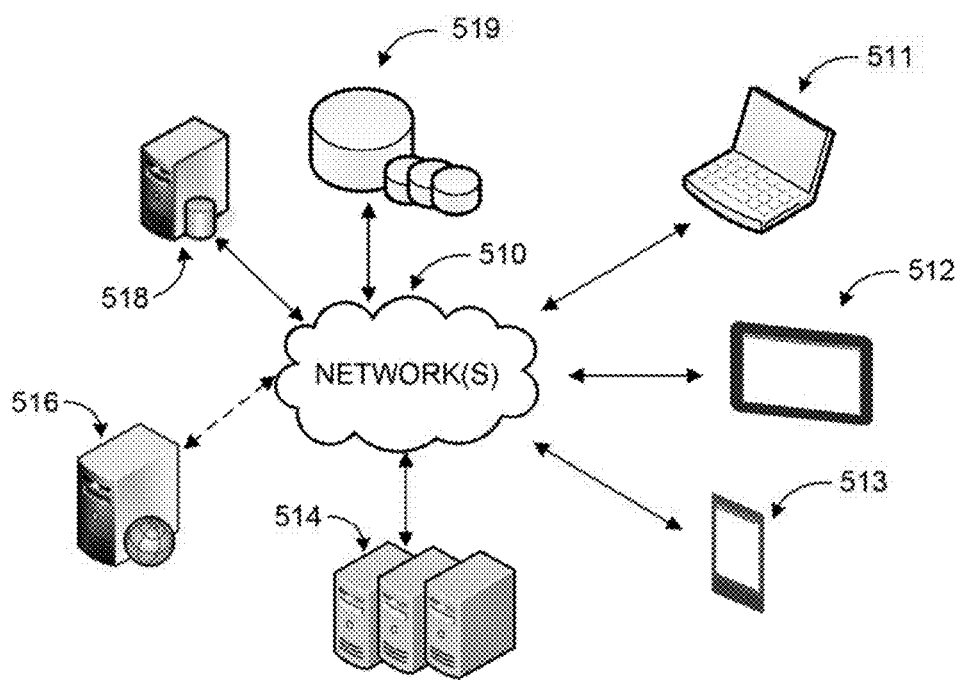
FIG. 5 is a simplified networked environment, where a system according to embodiments may be implemented.

FIG. 5 is an example networked environment, where embodiments may be implemented. A communication application configured to provide a rich preview of a communication in a communication summary may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication application may analyze a communication to identify relevant items (such as an image, and/or a video, among others) within the communication. A communication summary of the communication may be created with the relevant items. Next, the communication summary may be presented with the relevant items. Interaction elements to manage a presentation of the relevant items may also be provided. The communication application may store data associated with the communication in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a rich preview of a communication in a communication summary. Furthermore, the networked environments discussed in FIG. 5 are for illustration purposes only. Embodiments are not limited to the example applications, modules, or processes.

Figure 6:
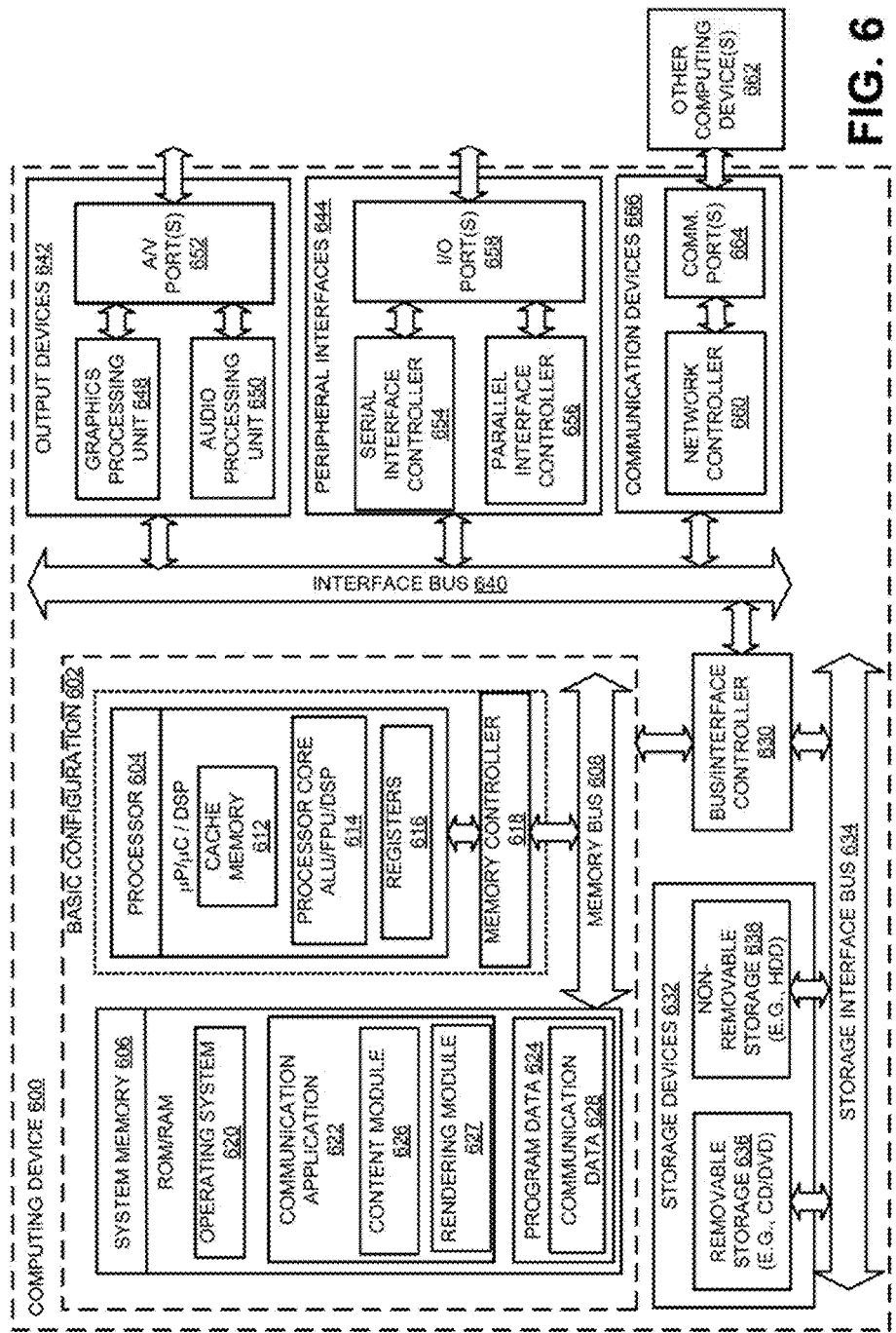
FIG. 6 is a block diagram of an example computing device, which may be used to provide a rich preview of a communication in a communication summary, according to embodiments.

FIG. 6 is a block diagram of an example computing device, which may be used to provide a rich preview of a communication in a communication summary, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for comnununication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof.

The system memory 606 may include an operating system 620, a communication application 622, and a program data 624. The communication application 622 may include components such as a content module 626 and a rendering module 627. The content module 626 and the rendering module 627 may execute the processes associated with the communication application 622. The content module 626 may analyze a communication to identify relevant items (such as an image, and/or a video, among others) within the communication. A communication summary of the communication may be created with the relevant items. Next, the rendering module 627 may present the communication summary with the relevant items. Interaction elements to manage a presentation of the relevant items may also be provided.

Components of the communication application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the communication application 622, displayed by the touch based device. The program data 624 may also include, among other data, communication data 628, or the like, as described herein. The communication data 628 may include a relevant item, and/or a communication, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide a rich preview of a communication in a communication summary. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
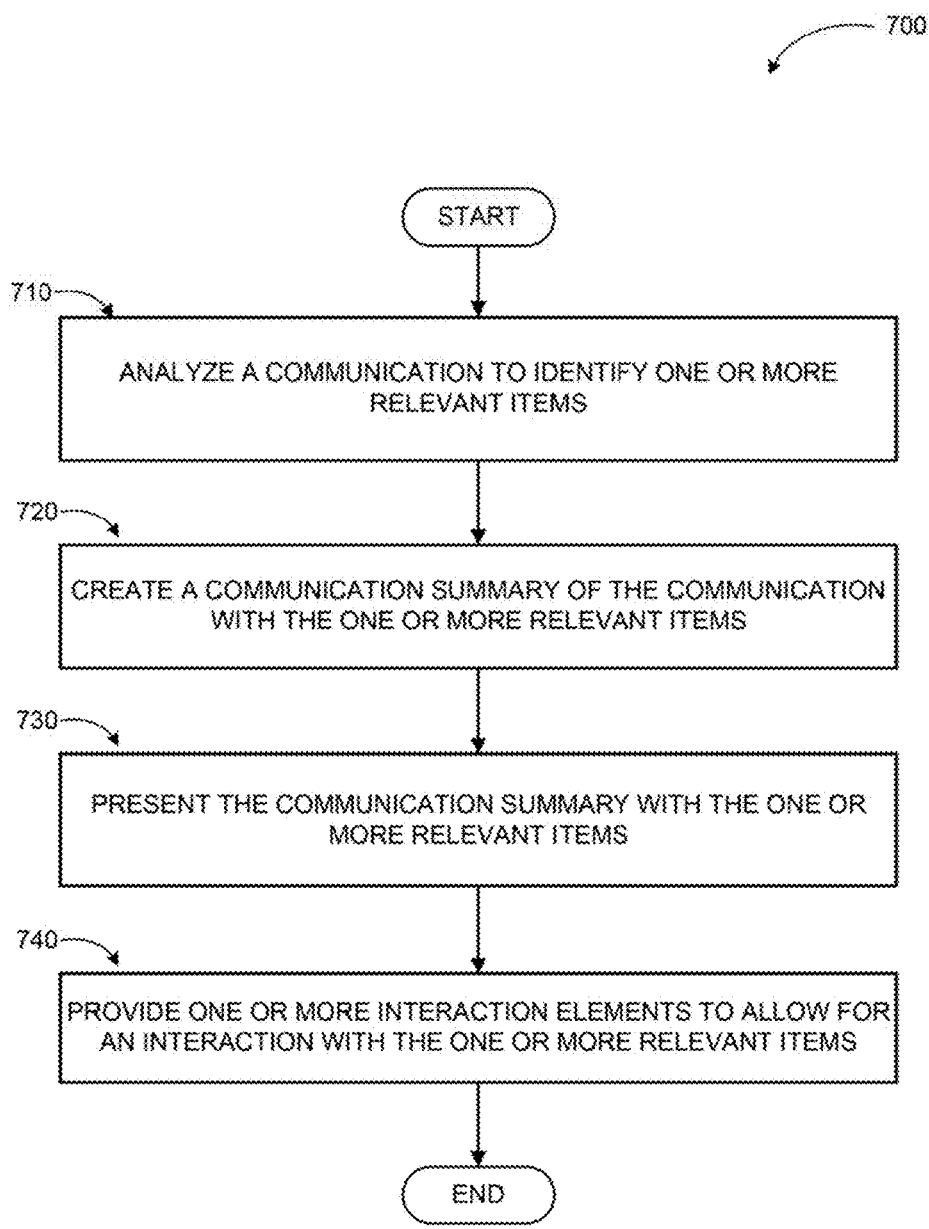
FIG. 7 is a logic flow diagram illustrating a process for providing a rich preview of a communication in a communication summary, according to embodiments.

FIG. 7 is a logic flow diagram illustrating a process for providing a rich preview of a communication in a communication summary, according to embodiments. Process 700 may be implemented on a computing device, such as the computing device 600 or another system.

Process 700 begins with operation 710, where a communication application may analyze the communication to identify relevant items within the communication. The items may include an image, a video, an audio, a document, a link, a task, and/or a meeting, among others. At operation 720, a communication summary of the communication may be created with the relevant items. The relevant items may be processed for a presentation based on a type of the relevant item.

At operation 730, the communication summary may be presented with the relevant items within a summary user interface (UI). The relevant items may be dynamically sized based on attributes of the relevant items and the size of the communication summary. At operation 740, interaction elements may be provided to manage the presentation of the relevant items. An interaction element may include operations to launch an application associated with a relevant item to present and manage the relevant item.

The operations included in process 700 are for illustration purposes. Providing relevance based dynamic hashtag navigation may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device for providing a rich preview of a communication in a communication summary is described. The computing device includes a display device, a memory configured to store instructions associated with a communication application, and one or more processors coupled to the memory and the display device. The one or more processors execute the communication application in conjunction with the instructions stored in the memory. The communication application includes a content module and a rendering module. The content module is configured to analyze the communication to identify one or more relevant items within the communication and create the communication summary of the communication with the one or more relevant items. The rendering module is configured to present, on the display device, the communication summary with the one or more relevant items and provide, on the display device, one or more interaction elements to manage a presentation of the one or more relevant items.

In other examples, the one or more relevant items includes one or more of: an image, a video, an audio, a document, a link, a task, and a meeting. The content module is further configured to identify an image as one of the one or more relevant items, detect a reading status of the image as unread. The rendering module is further configured to rescale, on the display device, the image to maximize a size of the image within the communication summary. The content module is further configured to identify two or more images as the one or more relevant items and sort the two or more images based on an importance criteria, where the two or more images are sorted based on a range from a high importance value to a low importance value. The rendering module is further configured to present, on the display device, the two or more images, as sorted, within the communication summary, where a navigation element is provided to access a subset of the two or more images when a size of the communication summary is insufficient to display the subset of the two or more images.

In further examples, the content module is further configured to identify a document as the one or more relevant items and detect attributes of the document, where the attributes include a document type, a document name, and one or more recent activities associated with the document. The rendering module is further configured to present, on the display device, the document type, the document name, and the one or more recent activities associated with the document within the communication summary. The content module is further configured to identify a video as one of the one or more relevant items and detect attributes of the video, where the attributes include a title, a source, and a description of the video. The rendering module is further configured to present, on the display device, the title, the source, and the description of the video within the communication summary. The content module is further configured to identify a link as one of the one or more relevant items and detect attributes of the link, where the attributes include a title, a source and a description of the link. The rendering module is further configured to present, on the display device, the title, the source, and the description of the link within the communication summary.

In some examples, a method executed on a computing device for providing a rich preview of a communication in a communication summary is described. The method includes analyzing the communication to identify one or more relevant items within the communication, where the one or more relevant items include one or more of an embedded item and an attached item, creating the communication summary of the communication with the one or more relevant items, presenting the communication summary with the one or more relevant items, and providing one or more interaction elements to allow for an interaction with the one or more relevant items.

In other examples, the method further includes detecting a meeting associated with the communication as one or the one or more relevant items, displaying a topic, a time, and a location of the meeting within the communication summary, detecting a conflict between the meeting and another meeting, and displaying the conflict within the communication summary, where the conflict includes one or more of the topic, the time, and the location associated with the meeting and the other meeting. The method further includes analyzing a content of the communication to identify a task as one of the one or more relevant items, parsing a subject and a time of the task, and presenting the subject and the time of the task within the communication summary.

In some examples a computer-readable memory device with instructions stored thereon for providing a rich preview of a communication in a communication summary is described. The instructions include actions that are similar to the actions of the method.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for providing a rich preview of a communication in a communication summary, the computing device comprising:
    a memory configured to store instructions;
    one or more processors coupled to the memory wherein the one or more processors, in conjunction with the instructions stored in the memory, are configured to:
        analyze the communication to identify a portion of a content of the communication which is determined to be of interest to a recipient based on the analysis;
        analyze the communication to identify a task described within the content of the communication for the recipient of the communication;

identify a subject and a time for the task based on the analysis;

combine the portion of the content of the communication and a selectable representation of the task to create the communication summary;

provide to be displayed the communication summary of the communication on a communication summary portion of a communication application user interface (UI), wherein the communication application UI displays the content of the communication in response to an action on the communication summary; and in response to user selection of the selectable representation of the task within the communication summary, launch an application to provide additional functionality associated with the task.

2. The computing device of claim 1, wherein the one or more processors are further configured to:

identify an image within the communication; and detect a reading status of the image as unread.

3. The computing device of claim 2, wherein the one or more processors are further configured to:

provide the image to be displayed within the communication summary, wherein the image is rescaled to maximize a size of the image within the communication summary.

4. The computing device of claim 1, wherein the one or more processors are further configured to:

identify two or more images within the communication; and sort the two or more images based on an importance criteria, wherein the two or more images are sorted based on a range from a high importance value to a low importance value.

5. The computing device of claim 4, wherein the one or more processors are further configured to:

provide to be displayed the two or more images, as sorted, within the communication summary, wherein a navigation element is provided to access a subset of the two or more images when a size of the communication summary is insufficient to display the subset of the two or more images.

6. The computing device of claim 1, wherein the one or more processors are further configured to:

identify a document within the communication; and detect attributes of the document, wherein the attributes include a document type, a document name, and one or more recent activities associated with the document.

7. The computing device of claim 6, wherein the one or more processors are further configured to:

provide to be displayed the document type, the document name, and the one or more recent activities associated with the document within the communication summary.

8. The computing device of claim 1, wherein the one or more processors are further configured to:

identify a video within the communication; and detect attributes of the video, wherein the attributes include a title, a source, and a description of the video.

9. The computing device of claim 8, wherein one or more processors are further configured to:

provide to be displayed the title, the source, and the description of the video within the communication summary.

10. The computing device of claim 1, wherein the one or more processors are further configured to:

identify a link within the communication; and detect attributes of the link, wherein the attributes include a title, a source and a description of the link.

11. The computing device of claim 10, wherein the one or more processors are further configured to:

provide to be displayed the title, the source, and the description of the link within the communication summary.

12. A method executed on a computing device for providing a rich preview of a communication in a communication summary, the method comprising:

analyzing the communication to identify a portion of a content of the communication which is determined to be of interest to a recipient based on the analysis;

analyzing the communication to identify a task described within the content of the communication for the recipient of the communication;

identifying a subject and a time for the task based on the analysis;

combining the portion of the content of the communication and a selectable representation of the task to create the communication summary;

providing to be displayed the communication summary of the communication on a communication summary portion of a communication application user interface (UI), wherein the communication application UI displays the content of the communication in response to an action on the communication summary; and in response to user selection of the selectable representation of the task within the communication summary, launching an application to provide additional functionality associated with the task.

13. The method of claim 12, further comprising:

detecting a meeting described within the communication as the task; and displaying a topic, a time, and a location of the meeting within the communication summary.

14. The method of claim 13, further comprising:

detecting a conflict between the meeting and another meeting; and displaying the conflict within the communication summary, wherein the conflict includes one or more of the topic, the time, and the location associated with the meeting and the other meeting.

15. A computer-readable hardware memory device with instructions stored thereon for providing a rich preview of a communication in a communication summary, the instructions comprising:

analyzing the communication to identify a portion of a content of the communication which is determined to be of interest to a recipient based on the analysis;

analyzing the communication to identify a task described within the content of the communication for the recipient of the communication;

identifying a subject and a time for the task based on the analysis;

combining the portion of the content of the communication and a selectable representation of the task to create the communication summary;

providing to be displayed the communication summary of the communication on a communication summary portion of a communication application user interface (UI), wherein the communication UI displays the content of the communication in response to an action on the communication summary; and in response to user selection of the selectable representation of the task within the communication summary, launching an application to provide additional functionality associated with the task.

16. The computer-readable memory device of claim 15, wherein the instructions further comprise:
identifying an image within the communication;
detecting a reading status of the image as unread; and
rescaling the image to maximize a size of the image within the communication summary.

\* \* \* \* \*